United States Patent [19]

Bowser, Jr. et al.

[11] 4,044,192

[45] Aug. 23, 1977

[54] THERMAL BATTERIES

[75] Inventors: George C. Bowser, Jr., Towson; Richard L. Blucher, Baltimore, both of Md.

[73] Assignee: Catalyst Research Corporation, Baltimore, Md.

[21] Appl. No.: 56,023

[22] Filed: July 10, 1970

[51] Int. Cl.² .............................................. H01M 6/00
[52] U.S. Cl. ................................................... 429/112
[58] Field of Search .................... 136/90, 83 R, 83 T, 136/112, 114; 429/112

[56] References Cited

U.S. PATENT DOCUMENTS

| | | | |
|---|---|---|---|
| 3,421,941 | 1/1969 | Osborne et al. | 136/90 |
| 3,425,872 | 2/1969 | Levy | 136/83 R |
| 3,445,289 | 5/1969 | Nerwin, Jr. et al. | 136/90 |
| 3,447,970 | 6/1969 | Jones | 136/90 |
| 3,470,027 | 9/1969 | Nielsen | 136/83 R |
| 3,516,868 | 6/1970 | Nee et al. | 136/90 |
| 3,527,615 | 9/1970 | Clark et al. | 136/83 T |
| 3,558,363 | 1/1971 | Franklin | 136/83 T |
| 3,575,714 | 4/1971 | Bennett et al. | 136/90 |

FOREIGN PATENT DOCUMENTS 1,815,819  8/1969  Germany .............................. 136/90

Primary Examiner—Harvey E. Behrend

[57] ABSTRACT

A thermal battery having improved performance under spin comprises an aligned stack of annular cell elements, including a combustible composition that forms a conductive ash on burning, forming a toroidal cell stack. A sheet of nonporous electrical insulating material such as mica tightly engages the outer peripheral surface of the cell stack and the central hole of the stack is filled with electrical insulating fuze material.

9 Claims, 3 Drawing Figures

INVENTORS
GEORGE C. BOWSER, JR.
AND RICHARD L. BLUCHER

THERMAL BATTERIES

This invention relates to a heat activated primary battery having improved performance under spin.

Heat activated batteries, commonly called thermal batteries operate on the principal that fused salts are ionically conductive and will function as an electrolyte in a primary battery. Thermal batteries utilizing a salt electrolyte that is inert and nonconducting at normal temperatures are activated by heating to raise the battery temperature to the fusing temperature of the electrolyte. Thermal batteries are used in various ordinance applications that subject the battery to spin conditions. Heretofore, thermal batteries could only withstand spin up to about 50 to 100 revolutions per second (r.p.s.), although it was desired to use thermal batteries in applications in which they would be subject to much higher spins, up to 300 r.p.s.

Accordingly, it is an object of this invention to provide a thermal battery suitable for use under high spin conditions. Another object is to provide such a battery having a stack of annular cell elements the outer periphery of which is sealed with a nonporous electrical insulating material and the inner periphery of which is covered by a combustible composition. Other objects will become apparent from the following description and claims.

The battery of this invention comprises an aligned stack of annular cell elements, including combustible heating elements, forming an assembly, hereinafter referred to as a cell stack, having a central hole extending vertically through it substantially on the axis of spin when in use. The central hole is filled with a combustible fuze material that when ignited will in turn ignite the combustible heating elements in the cell stack. The outer periphery of the cell stack is tightly enclosed by a sheet of nonporous electrical insulating material. The enclosed cell stack is contained in a hermetically sealed container and spaced from the container walls parallel to the axis of spin by a rigid noncompressible thermal insulation. Insulation between the cell stack and container walls perpendicular to the axis of spin may be compressible or noncompressible.

Figure 1:
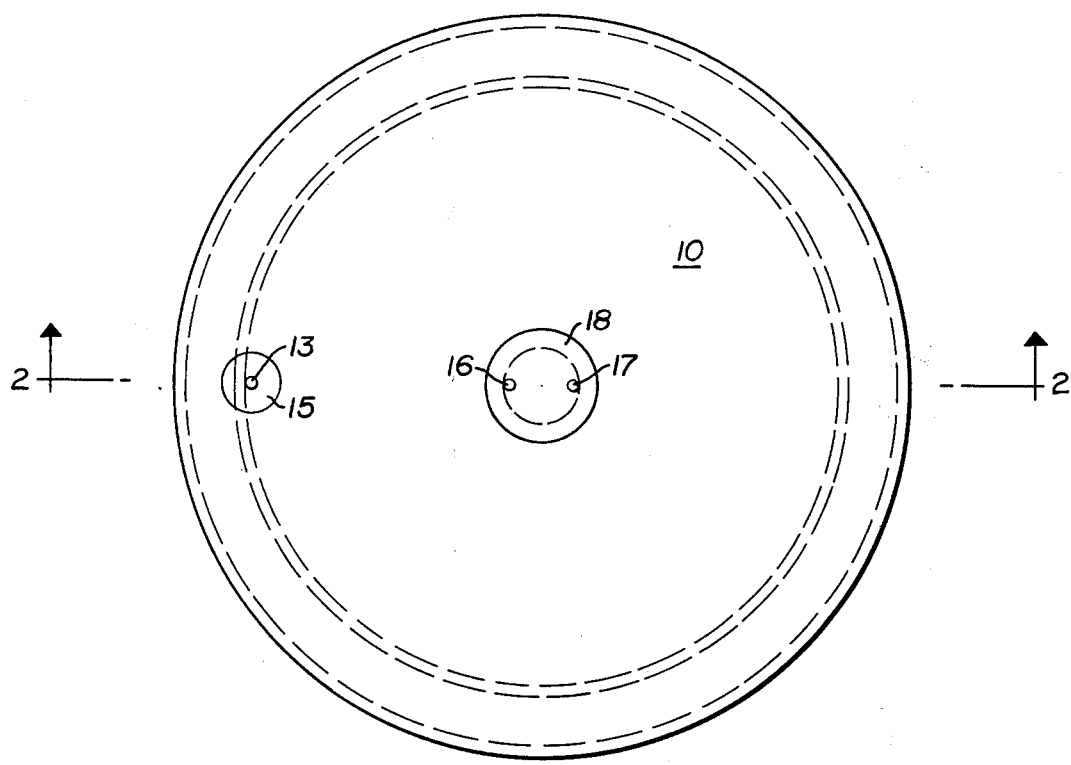
FIG. 1 is a top plan view of a battery embodying this invention.
Figure 2:
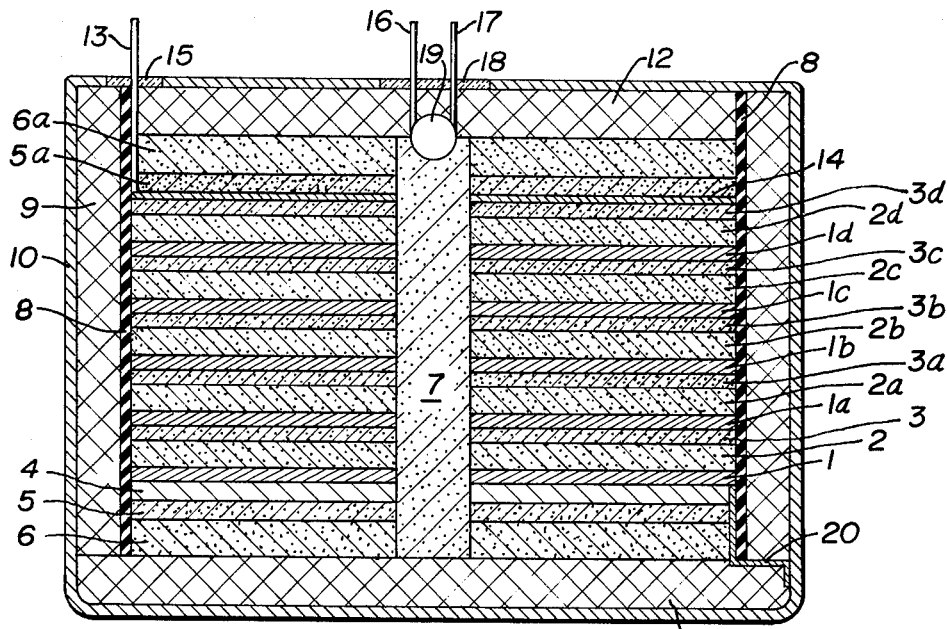
FIG. 2 is a vertical section of the battery of FIG. 1 taken on line 2—2.

Referring to FIG. 1 and FIG. 2, which illustrate a preferred battery assembly, the cell stack is made up of a stack of annular cell elements each being in direct contact with adjacent cell elements. Each cell is made up of a metal anode 1, 1a, 1b, 1c, and 1d, an electrolyte depolarizer pellet, 2, 2a, 2b, 2c, and 2d and a combustible composition pellet that also serves as a cathode current collector 3, 3a, 3b, 3c and 3d. A combustible composition pellet 4 provides heat to the outside of the bottom cell of the cell stack. Salt pellets 5 and 5a, positioned on the ends of the cell stack, suitably LiCl-LiSO$_4$ or KCl-LiSO$_4$, serve as a heat sink and temperature regulator. Additional heating is provided by combustible composition 6, and 6a. The central cavity of the cell stack is filled with a solid fuze material 7, that is electrically insulating and forms a solid electrically insulating ash when it is burned. The entire outer surface of the cell stack is in tight engagement with mica sheet 8. Rigid thermal insulation 9 is tightly fit between the mica sheet and metal container 10. Thermal insulation 11 and 12, spacing the cell stack from the end of the container, may be rigid insulation, the same as insulation 9, or a compressible insulation such as packed asbestos fibers. Positive terminal 13 connected to metal current collector 14 extends through the insulation and container wall, suitably hermetically sealed by Kovar glass to metal seal 15. Leads 16 and 17, hermetically sealed by Kovar seal 18, are connected to an electrical source for firing the electrical match or squib 19 to activate the battery. Negative terminal 20 is secured to the housing.

The electrolyte-depolarizer pellets of the cells of this invention are single layer wafers containing all the cell electro-chemical elements except the electrodes as disclosed in the copending application of Richard L. Blucher, Ser. No. 182,714, filed Mar. 22, 1962, of common ownership with this application. Such wafers or pellets are a compact of an intimate mixture of electrolyte, depolarizer and inert absorbent, the amount of absorbent being sufficient to absorb the electrolyte when it is melted. Generally, the depolarizer is present within the range of about 30 to 70 weight percent, the electrolyte within the range of about 20 to 45 percent and the absorbent in the range of about 5 to 30 weight percent, with the total of these three major components being essentially 100 percent. Suitable electrolytes include fusible alkali metal salts and mixtures thereof, such as, for example, lithium chloride-potassium chloride, lithium bromide-potassium bromide, lithium hydroxide-lithium chloride and other alkali metal salt mixtures, preferably eutectics. A variety of easily reducible oxidizing materials are known and can be used as depolarizers, suitably including potassium dichromate ($K_2Cr_2O_7$), potassium chromate ($K_2CrO_4$), barium chromate ($BaCrO_4$), calcium chromate ($CaCrO_4$), molydbic oxide ($MoO_3$), manganese dioxide ($MnO_2$), and tungstic oxide ($WO_3$). Illustrative inert absorbent materials include bentonite, kaolin, magnesium oxide and finely divided $SiO_2$ such as Cab-O-Sil.

A variety of metals may be used to provide the electrodes in thermal cells in accordance with well known electrochemical practice. For many purposes, it is preferred to use calcium as the anode and iron as the cathode, as this combination is productive of a high emf and calcium has a high melting point. However, various other metals may be used, such as, for example, magnesium anodes and cathodes of nickel, silver, or copper. The anode is conveniently formed of a laminar bimetal sheet having the lamina of active anode metal such as Ca on a lamina of metal with more structural rigidity, such as nickel or iron. The cathode may take various forms, suitably sheet metal or a pellet of compacted and/or sintered powdered metal. The metal component of the combustible composition, comprising a reducible metal and an oxidizer therefore, may serve as the cathode. In such cases, the reducing metal, suitably iron, of the composition is used in excess of stoichiometric amount that will react with the oxidizer component.

Figure 3:
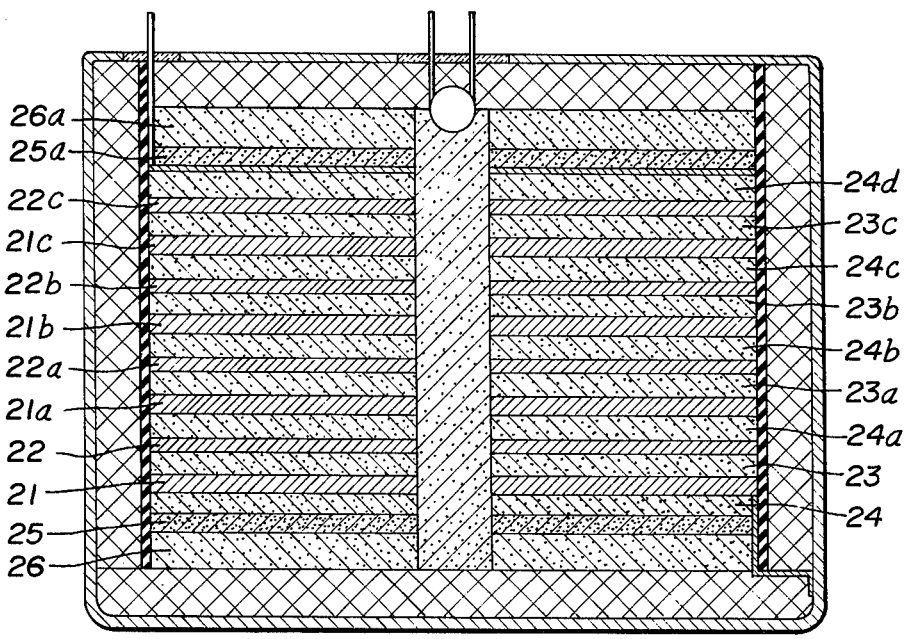
FIG. 3 is a vertical section of a battery like that of FIGS. 1 and 2 except that it incorporates a modified cell stack.

An alternative construction utilizing cell stacks suitable to be used in place of the cell stack shown in FIG. 2 uses a sheet metal cathode and a combustible composition interlayered between each electrolytic cell. FIG. 3 is a vertical section of such a modified battery in which each cell is made up of a metal anode 21, 21a, 21b and 21c, and a sheet metal cathode 22, 22a, 22b and 22c, spaced by an electrolyte-depolarizer pellet 23, 23a, 23b and 23c. The cells are interlayered between layers of combustible composition 24, 24a, 24b, 24c and 24d, that burn to give a solid electrically conductive ash. A heat regulating salt pellet 25 and 25a is positioned on either end of the cell stack and additional heating is provided by combustible composition 26 and 26a.

The combustible composition used in the cells are mixtures of metals and oxidizing agents therefor that burn without the liberation of substantially any gaseous products and that when burned form an electrically conductive ash, such as is disclosed in the copending application of William H. Collins, Ser. No. 378,489, filed June 23, 1964, of common ownership with this application. Such materials may consist of intimate mixtures of finely divided inorganic oxidizers and a reducing metal that will exothermically react to form an electrically conductive metal ash with or without inert diluents, either finely divided powders or fibers. Oxidizers may be metal oxides capable of being reduced by the reducing metal, or, in some cases, other oxidizers, such as alkali metal chlorates or nitrates. Illustrative combustible compositions that have a low conductivity but that form on burning an ash of very high conductivity are formed using as oxidizers higher metal oxides of metals having at least two valence states and that form on partial reduction an electrically conductive lower oxide, for example, tungsten trioxide and molybdenum trioxide. Suitable reducing metals for use with tungsten trioxide or molybdenum trioxide include iron, cobalt, nickel, chromium, aluminum, boron, magnesium, titanium, zirconium and tantalum. The proportion of metal in the combustible composition is not more than about the stoichiometric amount required to reduce the higher oxide to the desired lower oxidation state. Alternatively, the combustible composition may be made conductive by utilizing an excess of metal, the metal particles providing a conductive path both before and after burning.

The fuze strip may be any of many well known combustible material that are electrical insulators, such as, for example, mixtures of a major amount of barium chromate and a minor amount of zirconium. The fuze material may be a delay fuze composition, such as, for example, 4 parts silicon to 3 parts lead dioxide and 3 parts cuprous oxide, in which case a predetermined delay can be obtained between the time of ignition and time of electrical output from the battery.

It is essential to obtain the full benefit of this invention to tightly surround the outer periphery of the cell stack with a nonporous electrical insulation to form a seal with each cell. The preferred material is mica sheet as it forms an exceptionally effective seal, possibly by some limited reaction with the cell components when the battery is heated to activation temperature. Other nonporous materials can be used to somewhat less advantage such as glass board sealed with a high temperature cement or asbestos board sealed with water glass. Other rigid insulations, such as glass or asbestos board, do not provide this edge sealing action. To illustrate, several batteries were made in accordance with FIG. 1 and FIG. 2 except that the mica sheet was not used and the rigid insulation, Glass Rock No. 50, tightly engaged the outer periphery of the cell stack. The cell stack was made up to 10 cells having a calcium-iron bimetal anode, the calcium being the active anode metal, a depolarizer-electrolyte pellet consisting of an intimate mixture of 39.9% KCl, 25.1% LiCl, 37.0% CaCrO$_4$, and 7% Cab-O-Sil compacted at 15 tons per sq. inch, and a cathode-heating composition consisting of an intimate mixture of 90% iron and 10% KClO$_4$ compacted at 8 tons per sq. inch. The fuze material was 28% Zr and 72% BaCrO$_4$. The batteries were tested at various spins and the time, under load, for the output voltage to reach 12, 11 and 10 volts was measured, the 10 volt output representing the useful life of the battery in a particular application. The results set forth in Table 1 show that the performance of the battery at a spin of 100 r.p.s. was substantially the same as at zero spin, but that at a spin of 200 r.p.s. the performance had deteriorated to give less than ⅓ the zero spin life.

Table 1

| Spin (r.p.s.) | 12 Volts | Seconds to 11 Volts | 10 Volts |
| --- | --- | --- | --- |
| 0 | 74.5 | 124.2 | 174 |
| 100 | 70.0 | 110.0 | 155.0 |
| 200 | 29.0 | 45.0 | 54.0 |

When a mica sheet was wrapped around the cell stack, as shown in FIG. 1 and FIG. 2, an otherwise identical battery gave substantially the same performance at 200 r.p.s. as at zero spin:

Table 2

| Spin (r.p.s.) | 12 Volts | Seconds to 11 Volts | 10 Volts |
| --- | --- | --- | --- |
| 200 | 95.0 | 130.0 | 166.0 |

Another group of batteries were made as in FIG. 1 and FIG. 2 and the previous example, except that the amount of combustible composition was slightly decreased. The performance of these batteries at various spin conditions were as follows:

Table 3

| Spin (r.p.s.) | 12 Volts | Seconds to 11 Volts | 10 Volts |
| --- | --- | --- | --- |
| 0 | 79.0 | 122.0 | 156.0 |
| 150 | 75.0 | 120.0 | 157.0 |
| 300 | 75.0 | 120.0 | 157.0 |

Similar results are obtained with batteries having the modified cell stack as shown in FIG. 3.

We claim:

1. A thermal battery comprising an aligned stack of annular elements forming a toroidal cell stack having a central hole therethrough and an outer peripheral surface, said elements comprising an anode, a pellet element consisting essentially of an intimate finely divided mixture of a depolarizer, a fusible electrolyte and an inert absorbent, a cathode and a combustible composition that forms an electrically conductive ash on burning, a layer of rigid, nonporous electrical insulating material tightly engaging and covering said peripheral surface and a solid electrical insulating fuze material filling said central hole.

2. A battery according to claim 1 in which said layer is mica.

3. A battery according to claim 1 comprising said elements stacked in the sequence: (1) a metal anode, (2) a pellet element containing alkali metal salt electrolyte and (3) a combustible composition cathode consisting essentially of cathode metal and an oxidizer for said cathode metal.

4. A battery according to claim 1 having a hermetically sealed housing spaced from said layer by rigid thermal insulation, said combustible composition and fuze material producing substantially no gas on burning.

5. A battery according to claim 4 comprising annular elements stacked in the sequence (1) a metal anode, (2) a pellet element containing alkali metal salt electrolyte and (3) a combustible composition cathode consisting essentially of cathode metal and an oxidizer therefor.

6. A battery in accordance with claim 5 in which said layer is mica.

7. A battery according to claim 5 in which the anode is calcium and the combustible composition cathode is a mixture of iron and potassium chlorate.

8. A battery according to claim 6 in which the pellet contains lithium chloride, potassium chloride, calcium chromate and potassium chromate.

9. A battery according to claim 5 in which the fuze material consists essentially of a mixture of zirconium and barium chromate.

* * * * *